US012096349B2

United States Patent
Tiwari et al.

(10) Patent No.: US 12,096,349 B2
(45) Date of Patent: *Sep. 17, 2024

(54) METHOD AND SYSTEM FOR NETWORK SLICE AUTHENTICATION AND AUTHORIZATION

(71) Applicant: SAMSUNG ELECTRONICS CO., LTD., Suwon-si (KR)

(72) Inventors: Kundan Tiwari, Bangalore (IN); Rajavelsamy Rajadurai, Bangalore (IN); Hoyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,243

(22) Filed: Nov. 7, 2022

(65) Prior Publication Data
US 2023/0080989 A1 Mar. 16, 2023

Related U.S. Application Data

(63) Continuation of application No. 17/087,490, filed on Nov. 2, 2020, now Pat. No. 11,528,659.

(30) Foreign Application Priority Data

Nov. 2, 2019 (IN) .............................. 201941044467
Oct. 28, 2020 (IN) .............................. 201941044467

(51) Int. Cl.
*H04W 48/18* (2009.01)
*H04W 8/02* (2009.01)
(Continued)

(52) U.S. Cl.
CPC ............. *H04W 48/18* (2013.01); *H04W 8/02* (2013.01); *H04W 36/06* (2013.01); *H04W 48/16* (2013.01); *H04W 60/04* (2013.01); *H04W 76/11* (2018.02)

(58) Field of Classification Search
CPC ..... H04W 48/18; H04W 48/16; H04W 76/11; H04W 8/02; H04W 36/06; H04W 60/04
(Continued)

(56) References Cited

U.S. PATENT DOCUMENTS 10,264,506 B2 4/2019 Faccin et al.
10,880,806 B2 12/2020 Faccin et al.
(Continued)

FOREIGN PATENT DOCUMENTS

EP 2244521 B1 8/2018
EP 3694254 A1 8/2020
(Continued)

OTHER PUBLICATIONS

NEC, "Preventing UE waiting for completion of NSSAA indefinitely, C1-196442", 3GPP TSG-CT WG1 Meeting # 120, Portoroz (Slovenia), Oct. 7-11, 2019, 11 pages. (Year: 2019).*
(Continued)

*Primary Examiner* — Mong-Thuy T Tran

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments disclose a method and system for
(Continued)

handling a network slice specific authentication and authorization (NSSAA) process in a wireless network system.

16 Claims, 12 Drawing Sheets

(51) Int. Cl.
*H04W 36/06* (2009.01)
*H04W 48/16* (2009.01)
*H04W 60/04* (2009.01)
*H04W 76/11* (2018.01)

(58) Field of Classification Search
USPC .......................................................... 370/329
See application file for complete search history.

(56) References Cited

U.S. PATENT DOCUMENTS

| | | | | |
|---|---|---|---|---|
| 11,510,139 | B2* | 11/2022 | Tamura | H04W 12/06 |
| 11,539,699 | B2* | 12/2022 | Kunz | H04W 12/35 |
| 2018/0227873 | A1 | 8/2018 | Vrzic et al. | |
| 2019/0174449 | A1* | 6/2019 | Shan | H04W 60/04 |
| 2019/0297148 | A1 | 9/2019 | Zong et al. | |
| 2020/0162919 | A1 | 5/2020 | Velev et al. | |
| 2020/0267554 | A1 | 8/2020 | Faccin et al. | |
| 2020/0314701 | A1* | 10/2020 | Talebi Fard | H04W 36/08 |
| 2020/0351756 | A1* | 11/2020 | Jager | H04L 47/2475 |
| 2021/0120596 | A1 | 4/2021 | Youn et al. | |
| 2021/0204126 | A1* | 7/2021 | Tang | H04W 60/00 |
| 2021/0337383 | A1 | 10/2021 | Faccin | |
| 2021/0410060 | A1 | 12/2021 | Ianev et al. | |
| 2022/0295279 | A1* | 9/2022 | Kuge | H04W 12/06 |
| 2023/0085130 | A1* | 3/2023 | Ryu | H04W 48/18 |
| | | | | 455/410 |
| 2023/0262637 | A1* | 8/2023 | Sugawara | H04W 60/04 |
| | | | | 455/435.1 |
| 2023/0370844 | A1* | 11/2023 | Zhu | H04W 12/082 |

FOREIGN PATENT DOCUMENTS

| | | | |
|---|---|---|---|
| WO | 2018236819 | A1 | 12/2018 |
| WO | 2019098745 | A1 | 5/2019 |

OTHER PUBLICATIONS

Ericsson: "Slice and AMF selection at HO procedure", SA WG2 Meeting #124, S2-178552, Nov. 27-Dec. 1, 2017, 25 pages.
European Patent Office, "Supplementary European Search Report," dated Oct. 17, 2022, in connection with European Patent Application No. 20882089.4, 15 pages.
Samsung, "Handing of NSSAA during mobility between AMFs supporting NSSAA and non supporting," 3GPP TSG-CT WG4 Meeting #97e, E-Meeting, Apr. 15-24, 2020, C4-202232, 13 pages.
Interdigital, "Introduction of pending NSSAI for network slice specific authentication and authorization," 3GPP TSG-CT1 Meeting #120, Portoroz, Slovenia, Oct. 7-11, 2019, C1-196089, 41 pages.
International Search Report and Written Opinion of the International Searching Authority in connection with International Application No. PCT/KR2020/015153 dated Jan. 29, 2021, 7 pages.
NEC, "Preventing UE waiting for completion of NSSAA indefinitely," C1-196441, 3GPP TSG-CT WG1 Meeting #120, Portoroz (Slovenia), Oct. 7-11, 2019, 3 pages.
Vivo, et al., "Deregistration due to the failed network Slice-Specific Authentication and Authorization," C1-196970 (was C1-196568), 3GPP TSG-CT WG1 Meeting #120, Portoroz (Slovenia), Oct. 7-11, 2019, 12 pages.
The First Office Action dated Nov. 28, 2023, in connection with Chinese Patent Application No. 202080076389.1, 23 pages.

* cited by examiner

Enumeration Authentication Status

| Enumeration Value | Description |
|---|---|
| "EAP_Success" | The NSSAA status is EAPSuccess |
| "EAP_Failure" | The NSSAA status is EAPSuccess |
| "Pending" | The NSSAA status is pending i.e. the NSSAA process is ongoing |

NSSAA Status

| Attribute name | Data type | P | Cardinality | Description |
|---|---|---|---|---|
| S-NSSAAI | Snssai | M | 1 | Subscribed S-NSSAI |
| Status | AuthStatus | M | 1 | This flag when present shall indicate the NSSAA status of the related S-NSSAAI. |

METHOD AND SYSTEM FOR NETWORK SLICE AUTHENTICATION AND AUTHORIZATION

CROSS-REFERENCE TO RELATED APPLICATIONS

This application is a continuation of application Ser. No. 17/087,490, now U.S. Pat. No. 11,496,956 issued Nov. 8, 2022, which is based on and claims priority under 35 U.S.C. § 119(a) to Indian Patent Application No. 201941044467 (PS) filed on Nov. 2, 2019, and Indian Patent Application No. 201941044467 (CS) filed on Oct. 28, 2020 in the Indian Patent Office, the disclosures of which are herein incorporated by reference in their entirety.

BACKGROUND

1. Field

The present disclose relates to method and apparatus for network slice authentication and authorization.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-tip-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the technology.

SUMMARY

Accordingly, embodiments herein disclose a method for handling a network slice specific authentication and authorization (NSSAA) process in a wireless network system. The method includes detecting, by a source access and mobility function (AMF) device, the NSSAA process is ongoing for at least one single network slice selection assistance information (S-NSSAI) and an inter-AMF handover procedure is triggered from the source AMF device to a target AMF during the NSSAA process. The method includes storing, by the source AMF device, the NSSAA status of the NSSAA process of the at least one S-NSSAI as pending; and transferring, by the source AMF device, the stored NSSAA status of the at least one S-NSSAI to the target AMF device upon detecting a completion or abortion of the NSSAA process.

In an embodiment, the method further includes receiving, by the target AMF device, the NSSAA status of the NSSAA process of the at least one S-NSSAI marked as pending, and initiating, by the target AMF device, the NSSAA process for the at least one S-NSSAI. The method further includes detecting, by the source AMF device, the NSSAA process is completed or aborted, and marking, by the source AMF device, the at least one S-NSSAI as a part of one of an allowed NSSAI list or a rejected S-NSSAI list.

In an embodiment, the target AMF device supports the NSSAA process.

In an embodiment, the method further includes updating, by the target AMF device, the NSSAA status of the NSSAA process of the at least one S-NSSAI from pending to complete upon completion of the initiated NSSAA process.

In an embodiment, the method includes updating, by the target AMF device, a status of the at least one S-NSSAI from requested S-NSSAI to allowed S-NSSAI upon successful completion of the NSSAA process of the at least one S-NSSAAI. The method further includes sending, by the target AMF device, the updated status of the at least one S-NSSAI to a user equipment (UE).

In an embodiment, the ongoing NSSAA process corresponds to non-assignment of a protocol data unit (PDU) session to a user equipment (UE) for the at least one S-NSSAI Accordingly, embodiments herein disclose a wireless network system for handling a network slice specific authentication and authorization (NSSAA) process. The system includes a source AMF device, and a target AMF device. The source AMF device includes a memory, a processor, and a source NSSAA process controller, communicatively connected to the memory and the processor. The source NSSAA process controller is configured to detect the NSSAA process is ongoing for at least one single-network slice selection assistance information (S-NSSAI) and an inter-AMF handover process is triggered from a source AMF to a target AMF during the NSSAA process. Further, the source NSSAA process controller is configured to store a NSSAA status of the NSSAA process of the at least one S-NSSAI as pending. The source NSSAA controller is further configured to transfer the stored NSSAA status of the NSSAA process of the at least one S-NSSAI to the target AMF upon detection of one of a completion or abortion of the NSSAA process.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6A illustrates a table indicating types of authentication status for a NSSAA process associated with a S-NSSAI slice, according to embodiments as disclosed herein of;

FIG. 6B illustrates a table representing NSSAA status for specific S-NSSAI slice in the UE context message, according to embodiments as disclosed herein of;

DETAILED DESCRIPTION

Figure 1:
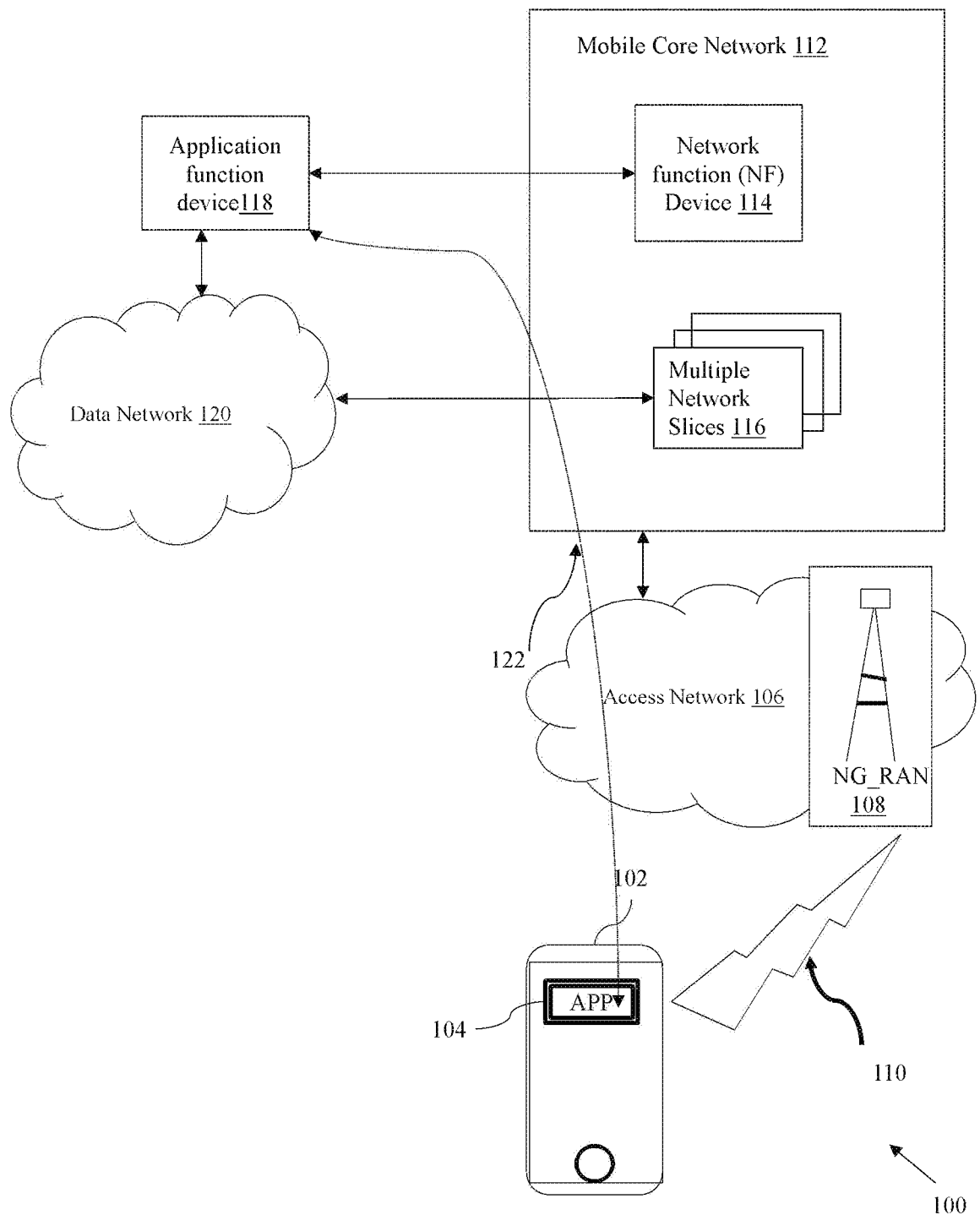
FIG. 1 illustrates a wireless communication system for network slice authentication, according to an embodiment as disclosed herein.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Network slicing is developed as an important feature of the fifth generation (5G) of a wireless communication network. The network slicing is a method of designing unique logical and virtualized networks over a common physical network infrastructure. The network slicing supports new services with different network capability requirements such as latency, throughput, bandwidth, and reliability. For example, an internet of things (IoT) system might need a low latency and low bandwidth whereas a broadband system needs high bandwidth and throughput. Accordingly, network services that are independent for each type of application service or user and that are more flexible can be provided by selecting and combining network functions of the 5G system depending on a service or user.

Furthermore, due to increasing bandwidth capability of the 4G/5G wireless network systems, it is expected that mobile network operators would be managing hundreds or thousands of network slices, and each slice can have its own architecture, management, and security to support a specific use case. Therefore, authentication becomes a critical component of network slicing. Accordingly, network slice specific authentication and authorization (NSSAA) process is defined in $3^{rd}$ generation partnership project (3GPP) standard protocol processes. The NSSAA process is performed for access of the network slice for any application service.

Although the NSSAA process is defined in the 3GPP standards, there is unavailability of a procedure for handling of pending or ongoing NSSAA processes during a handover process from a source Access and Mobility Management Function (AMF) to a target AMF.

In view of the above, there is a need of a system or a method to provide step by step processes for handing ongoing or pending NSSAA processes during the handover of a user equipment (UE) from the source to the target radio access network (RAN).

The principal object of the embodiments herein is to provide a method and a system for handling NSSAA process related to at least one single-network slice selection authentication information (S-NSSAI) during a handover process of a UE from a source AMF to a target AMF, without skipping any ongoing or pending NSSAA process.

Another object of the embodiment herein is to enable an access and mobility function (AW) associated with the source new generation RAN (NG_RAN) to prioritize one of the handover process or the ongoing or pending NSSAA processes based on NSSAA capability of a target AMF associated with the target NG_RAN.

Accordingly, embodiments herein achieve a method for handling a network slice specific authentication and authorization (NSSAA) process in a wireless network system. The method includes detecting, by a source access and mobility function (AMF) device, that a NSSAA process is ongoing for a single network slice selection assistance information (S-NSSAI) and an inter-AMF handover process is triggered from the source AMF device to a target AMF device during the NSSAA process. The method includes storing, by the source AMF device, the NSSAA status of the S-NSSAI as pending; and transferring, by the source AMF device, the stored NSSAA status of the S-NSSAI to the target AMF device upon detecting a completion or abortion of the NSSAA process.

In the existing method, there is lack of information regarding handling of ongoing or pending NSSAA processes during handover of a user equipment (UE) from the source AMF device associated with a source new generation radio access network (NG_RAN) to a target AMF device associated with a target NG_RAN. Currently, access and mobility functions are not configured to handle ongoing or pending NSSAA processes during the handover of UE.

Unlike conventional methods and systems, the proposed method can be used to handle ongoing or pending NSSAA processes of respective network slice selection authentication information (NSSAIs) during handover process of the UE from source NG_RAN to target NG_RAN. Thus, eliminating issues of missing out any ongoing or pending NSSAA process after handover, or any error in the implementation of the ongoing or pending NSSAA process due to the handover.

In the proposed method, the ongoing or pending NSSAA process of the S-NSSAI is carefully handled during the handover process of the UE from the source AMF to the target AMF by prioritizing either the handover process or the ongoing or pending NSSAA process according to target AMF capabilities. Thus, a defined process for handling the ongoing or pending NSSAA processes during the handover process, ensures a smooth handover without degrading the execution of the ongoing or the pending NSSAA process.

Referring now to the drawings, and more particularly to FIGS. 1-9, where similar reference characters denote corresponding features consistently throughout the figures, there are shown preferred embodiments, FIG. 1 illustrates a wireless communication system (100) for network slice authentication, according to an embodiment of the disclosure.

The wireless communication system (100) includes at least one user equipment (UE) (102), an application (104) installed in the UE (102), an access network (106) containing at least one radio access network node (i.e. new generation radio access network (NG_RAN) (108), and a mobile core network (112). The access network (106) and the mobile core network (112) form a mobile communication network. The access network (106) may include a 3GPP access network and/or a non-3GPP access network (e.g., Wi-Fi).

The UE (102) communicates with the access network (106) using a wireless communication link (110). Even though single UE (102), access network (106), single NG_RAN (108), single wireless communication link (110), and single mobile core network (112) are depicted in FIG. 1, one of skill in the art will recognize that any number of UEs (102), access networks (106), NG_RANs (108), wireless communication links (110), and mobile core networks (112) may be included in the wireless communication system (100).

In one implementation, the wireless communication system (100) is compliant with the 5G system (and beyond 5G systems) specified in the 3GPP specifications. The present disclosure is not intended to be limited to the implementation of any particular wireless communication system architecture or protocol.

The UE (102) can be, for example but not limited to a cellular phone, a tablet, a virtual reality device, a smart phone, a laptop, a personal digital assistant (PDA), a global positioning system, a multimedia device, a video device, an IoT device, and a smart watch. In an embodiment, the 3GPP network maintains the communication standard according to protocols defined in the $3^{rd}$ generation partnership project for mobile telecommunications.

The UEs (102) may communicate directly with one or more of the NG RAN (108) in the access network (106) via uplink ("UL") and downlink ("DL") communication signals. Furthermore, the UL and DL communication signals may be carried over the communication link (110). Here, the access network (106) may act as an intermediate network that provide the UE (102) with access to the mobile core network (112).

In some embodiments, the UE (102) communicates with an application function (AF) device (118) via a network connection with the mobile core network (112). For example, the application (104) in the UE (102) (e.g., web browser, media client, telephone/VoIP application) may trigger the UE (102) to establish a data connection (i.e. a protocol data unit (PDU) session) with the mobile core network (112) via the NG_RAN (108). The mobile core network (112) relays traffic between the UE (102) and the AF device (118) using the established PDU session. Note that the UE (102) may establish one or more PDU sessions with the mobile core network (112). The UE (102) may establish additional PDU sessions for communicating with other data network and/or other remote hosts.

The NG_RAN (108) may be distributed over a geographic region. The NG_RAN (108) may also be referred to as an access terminal, an access point, a base station, a Node-B, an eNB, a gNB, a Home Node-B, a relay node, a device, or by any other terminology used in the att. The NG_RAN (108) are generally part of the radio access network, such as the access network (106), that may include one or more controllers communicably coupled to one or more corresponding NG_RAN (108). These and other elements of radio access network are not illustrated but are well known generally by those having ordinary skill in the art. The NG_RAN (108) connects to the mobile core network (112) via the access network (106).

The NG_RAN (108) may serve a number of the UEs (102) within a serving area, for example, a cell or a cell sector, via the wireless communication link (110). The NG_RAN (108) may communicate directly with the UEs (102) via the uplink and downlink communication signals. Generally, the NG_RAN (108) transmits DL communication signals to serve the UEs (102) in the time, frequency, and/or spatial domain. The wireless communication link (110) may be any suitable carrier in licensed or unlicensed radio spectrum. The wireless communication link (110) facilitate communication between the one or more UEs (102) and/or one or more of the NG_RANs (108).

In an embodiment, the mobile core network (106) is a 5G core ("5GC"), which may be coupled to a data network (120), such as the internet and private data networks, among other data networks. In some embodiments, the UE (102) communicates with the application function (118) (external to the mobile core network (112)) via the data network (120) and the mobile core network (112). The UE (102) may have a subscription or other account with the mobile core network (112). Each mobile core network (112) belongs to a single public land mobile network ("PLMN"). The present disclosure is not intended to be limited to the implementation of any particular wireless communication system architecture or protocol. For example, other embodiments of the mobile core network (112) may include an enhanced packet core ("EPC") or a multi-service core as describe by the Broadband Forum ("BBF").

The mobile core network (112) includes several network functions ("NFs") (114), and multiple network slices (124).

The NFs (114) comprises user plane functions and control plane network functions used for exchanging control and data packets with the UE (102) for specific applications.

The multiple network slices (116) are logical networks within the mobile core network (112). The network slices (116) are partitions of resources and/or services of the mobile core network (112). Different network slices (116) may be used to meet different service needs (e.g., latency, reliability, and capacity). In certain embodiments, each of the multiple network slices (116) includes its own dedicated network functions (not shown), such as independent control plane network function device and user plane function device.

Examples of different types of network slices (116) include enhanced mobile broadband ("eMBB"), massive machine-type communication ("mMTC"), and ultra-reliability and low latency communications ("URLLC"). A mobile core network (112) may include multiple network slice instances of the same network slice type, which can be differentiated using a slice "differentiator" associated with the slice instance.

According to an example embodiment, the application (104) running on the UE (102) communicates with the AF device (118) via a data path (122) that passes through a network slice (116) of the mobile core network (112). Additionally, the AF device (118) may send information to the mobile core network (112) which can be used to optimize the network internal configuration or network behavior. In certain embodiments, the AF device (118) is an application server ("AS") enabling the application (104) to access and use functionality provided by the application server over standardized interfaces (e.g., APIs).

The wireless communication system (100) is capable of authenticating users to a network slice, specifically providing network slice access authentication and authorization using user identities and credentials different from the 3GPP subscription permanent identifier (SUN), as described above. While a secondary authentication (i.e. network slice access authentication) for a PDU session is performed during the PDU establishment procedure, a user identity authentication is performed during the registration procedure.

Figure 2:
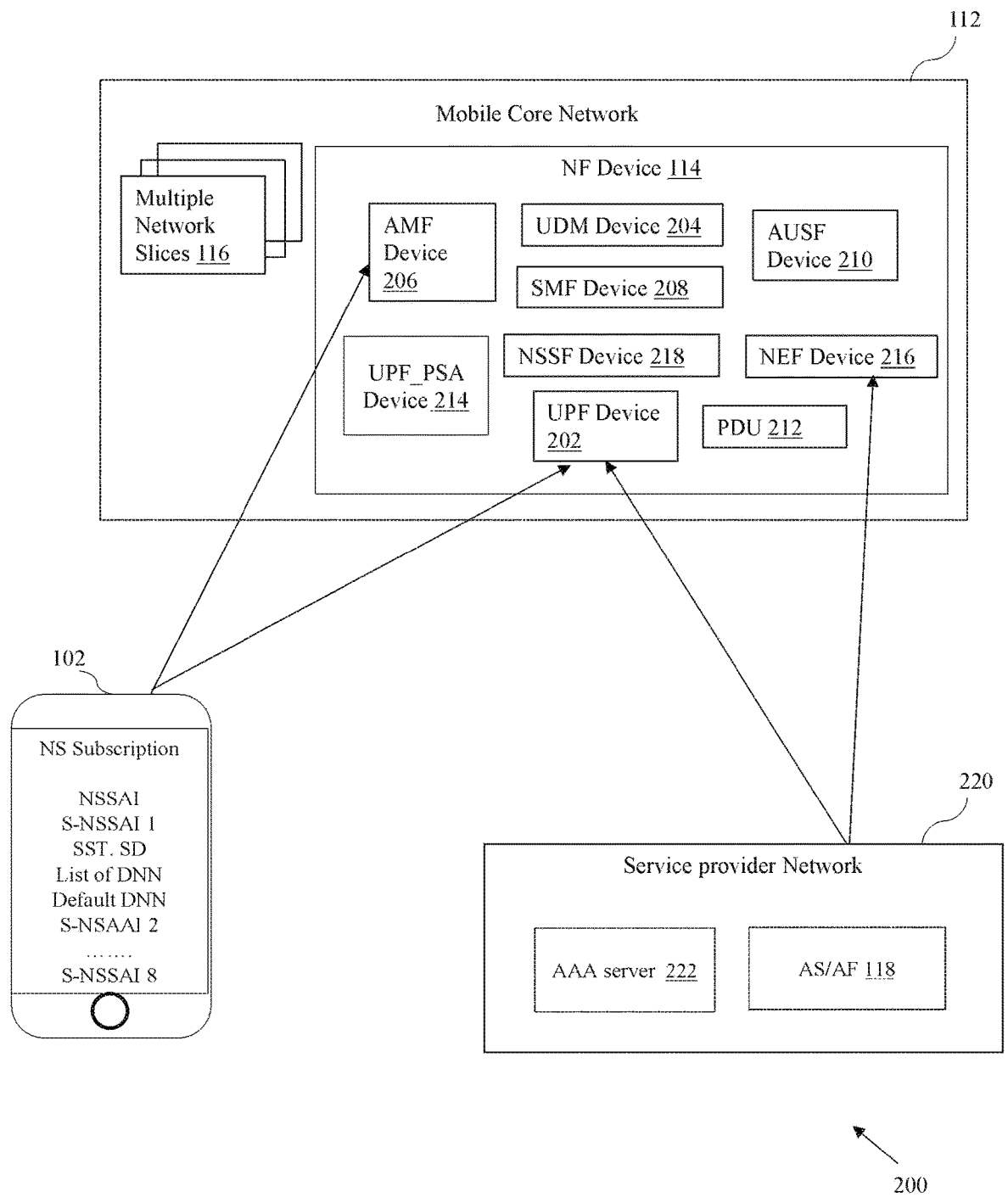
FIG. 2 illustrates a network architecture of the wireless network system for network slice authentication, according to an embodiment as disclosed herein.

Further, the various components of the mobile core network (112) and different functions of the components of the mobile core network (112) for the NSSAA process are illustrated in detail in FIG. 2.

FIG. 2 illustrates an architecture diagram (200) of the wireless network system (100) for network slice specific authentication, according to the embodiments as disclosed herein.

As shown in the FIG. 2, the network architecture (200) depicts the UE (102), which has NSSAA capability, in communication with the mobile core network (112).

The mobile core network (112) comprises the NF device (114) and network slices (116). The NF device (114) comprises a user plane function (UPF) device (202), a user data management (UDM) device (204), an access and management function (AMF) device (206), a session management function (SMF) device (208), an authentication server function (AUSF) device (210), a protocol data unit (PDU) (212), a user plane function (UPF)-PDU session anchor (UPF_PSA) device (214), a network exposure function (NEF) device (216), and a network slice selection function (NSSF) device (218). The UDM device (204), the AMF device (206), the SW device (208), the AUSF device (210), the PDU (212), UPF_PSA device (214), the NEF device (216), and the NSSF device (218) constitute the control plane network function of the NEF device (114). The control plane network functions provide services such as UE registration, UE connection management, UE mobility management, session management, and the like. In contrast, the UPF device (202) provides data transport services to the UEs (102).

The UE (102) uses the mobile core network (112) to access a service in a service provider network (220). Depicted within the service provider network (220) are the application server/application function ("AS/AF") device (118) and a service provider authentication, authorization and accounting (AAA) server (222) (interchangeably may also be referred as ("AAA-S (222)").

The UDM device (204) comprises unified data of users associated with the respective UEs (102) and maintains user data repository ("UDR"). The UDM device (204) holds subscription data including policy data. Specifically, the policy data stored by the UDM device (204) includes a network slice selection policy (NSSP).

The NEF device (216) implements a "front end" service that interfaces with external application functions and exposes the capabilities of the mobile core network (112) to these functions. For example, the NEF device (216) can be used by the AF device (220) to communicate with the UDM device (204), for example to provide network slice authentication information as described herein. Thus, the NEF device (216) provides a single point of contact for external applications that want to utilize the services offered by the internal network functions of the mobile core network (112) (e.g., services of the UDM device (204), AMF device (206), SMF device (208), etc.). The AUSF device (210) performs authentication of the UE (102). The NSSF device (218) selects a network slice instance (NSI) based on information provided during connection with the UE (102). A set of AMF device (206), SMF device (208) or UPF device (202) are provided to the UE (102) based on which network slices (116) the UE (102) has access to. The SMF device (208) manages allocation of IP address of the UE (102), and controls selection of UPF device (202) for the PDU session of the UE (102).

Further, according to an embodiment, it can be assumed that the network service provider (220) (including an application server (AS) or application function (AF) (118) and the AAA-S (222)) is located outside the mobile core network (112), and is communicating with the UDM device (204), e.g., via the NEF device (216). Note that the AAA-S (222) may be located in or outside the mobile core network (112) domain. In some embodiments, if the service provider network (220) is located inside the mobile core network (112), then the AS/AF device (118) and SP-AAA (222) may directly communicate with the UDM device (204). The UDM (204) performs a binding of a UE subscription to a user identity (ID) as well as the subscribed service with information about the service provider. As used herein, the user ID uniquely identifies a registration/subscription of the UE (102) for a particular service at the service provider network (220). Note that the UE (102) also stores an association between the S-NSSAI and corresponding credentials for network slice authentication, as discussed in further detail below. For example, the UE (102) may store network slice information (e.g., including the user ID and security credentials) at an application module.

During a network slice authentication procedure, authentication messages encapsulated within a NAS messages are exchanged between the UE (102) and the AAA-S (222). One or more applications (104) may be registered at the AAA-S (222), so the AAA-S (222) should forward the authentication messages to the appropriate application (104). Additionally, there may be one or more application modules at the UE (102). The application module may be an extensible authentication protocol (EAP) client in the UE (102). The EAP client may store different authentication information for each S-NSSAI. The EAP client may be a different application than the application (104) which sends/receives the real data. Note that information related to the application (104) is identified in the NSSP in the UDM device (204). Further, according to an embodiment, the AMF device (206) is configured to receive all connection and session related information from the UE (102) but is responsible only for handling connection and mobility management tasks such as connection of the UE (102) with NG_RAN (108), connection of the UE (102) to the AAA-S (222), or handling NSSAA process for S-NSSAAI.

According to an example embodiment, the application (104) may be a media streaming client application, e.g., providing a video streaming service to subscribers. Via the application (104), the user may access server(s) of the video streaming service provider to subscribe and receive the S-NSSAI associated with the video streaming client application. In some embodiments, the S-NSSAI is stored at the application (104). For example, the application (104) may include the network slice authentication information which is stored in the UE (102). In other embodiments, the S-NS- SAI is stored at an application module that is different than the application (104), for example the application module may be an EAP client that is a different application than the media streaming application. Here, the application module performs authentication with the AAA-S (222), while the media streaming application sends/receives data from the AS/AF (118).

Although specific numbers and types of network functions are depicted in the FIG. 1, a person having ordinary skills in the art will recognize that any number and type of network functions may be included in the mobile core network (112).

Figure 3A:
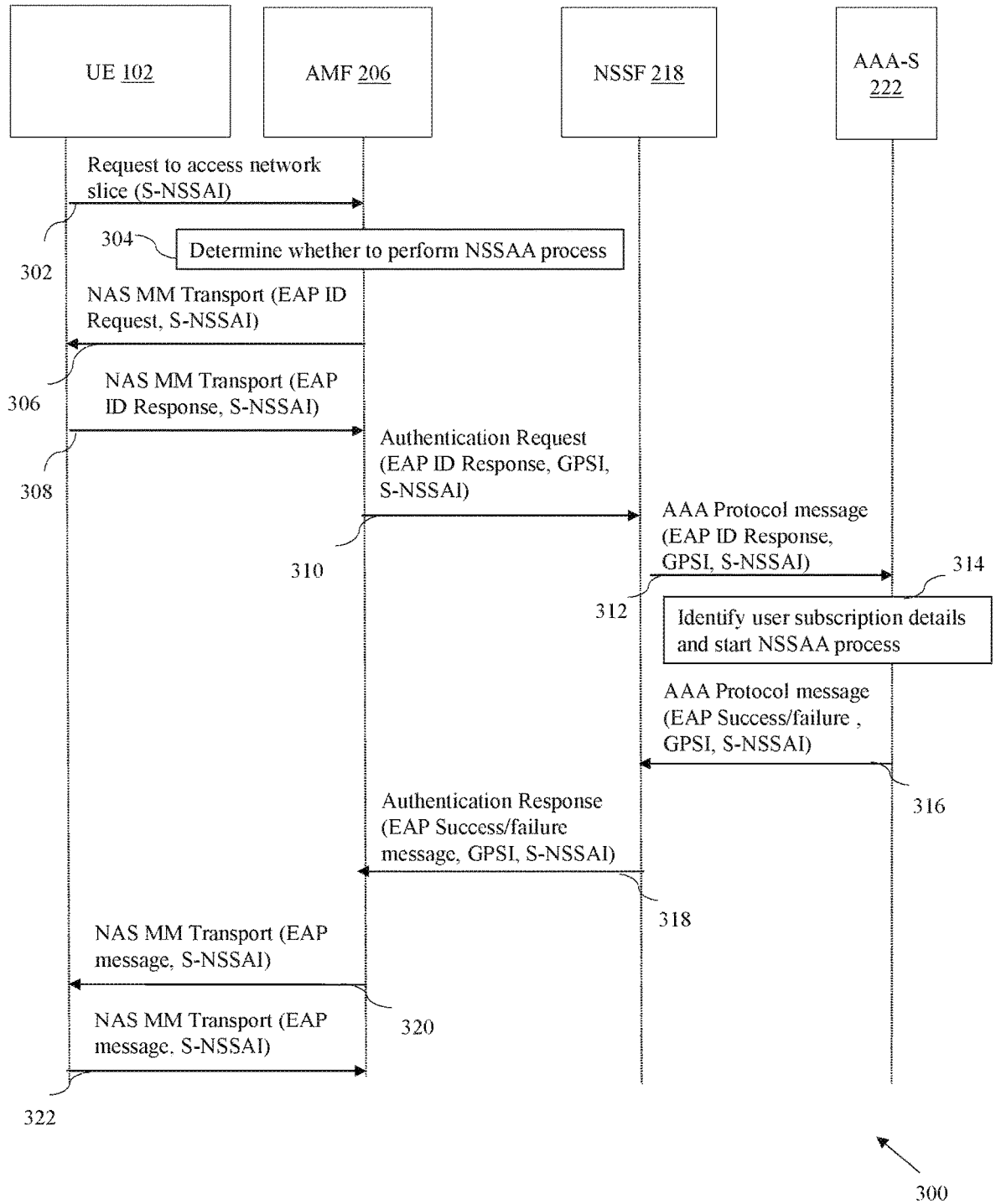
FIGS. 3A and 3B collectively illustrate a sequence diagram representing a network slice authentication and authorization process, according to an embodiment as disclosed herein.
Figure 3B:
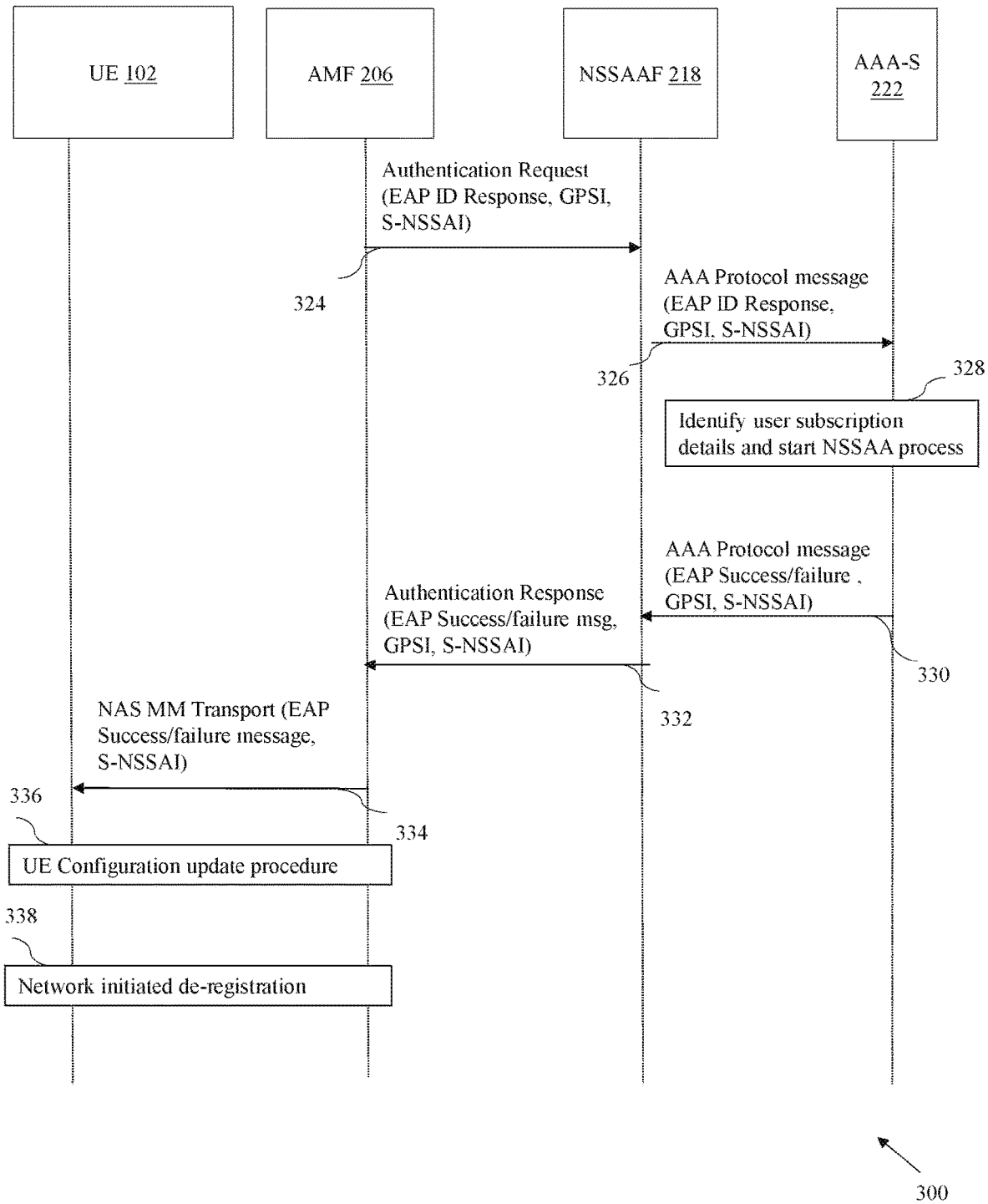

FIGS. 3A and 3B collectively illustrate a sequence diagram representing a network slice authentication and authorization process (300), according to an embodiment as disclosed herein.

In an embodiment, the UE (102) is already registered with the AMF device (206). The AMF device (206) has UE subscriptions details related to subscribed services and associated network slices (116). At step 302, the UE (102) sends a request to the AMF device (206) to access at least one S-NSSAI slice (116a) of multiple network slices (116) associated with the application (104) running at the UE (102). At step 304, the AMF device (206) determines whether the requested S-NSSAI slice (116a) requires network slice specific authentication and authorization (NS-SAA) process or not. For example, but not limited to, the AMF device (206) may decide to perform the NSSAA process for the requested S_NSSAI slice (116a) if the request to access the S-NSSAI slice (116a) is received for the first time from the UE (102), or if there is any change in subscription ID, user login credentials or user ID for the account associated with the requested S-NSSAI slice (116a).

At step 306, the AMF device (206) sends a request to the UE (102) to share an authentication ID (i.e. EAP ID) associated with the requested S-NSSAI slice (116a). The authentication ID details are stored in the UE (102) upon successful registration/subscription of the UE (102) with the service provider network (220) for the requested S-NSSAI slice (116a). At step 308, the UE (102) sends a response to the AMF device (206) to share the requested EAP ID associated with the requested S-NSSAI slice (116a). The steps 306 and 308, are part of primary authentication for the user subscription details at the AMF device (206), and not constitute the NSSAA process. At step 310, the AMF device (206) sends an authentication message to the NSSF device (218). The authentication message includes the EAP ID of the S-NSSAI, and generic public subscription identifier (GPSI) of a third-party service provider subscribed by the UE (102). The GPSI is used as a means of addressing a 3GPP subscription in data networks outside the realms of a 3GPP system, for example if the service is associated with third-party provider, and S-NSSAI slice (116a) is used by the third-party service provider, then GPSI is global ID of the third-party service provider. The NSSF device (218) is a device which communicates with the external service provider network (220). The NSSF device (218) receives IP address of the AAA-S (222) of the service provider network (220) from the AMF device (206).

At step 312, the NSSF device (218) forwards the authentication message to the AAA-S (222) as an AAA protocol message. The AAA protocol message indicates a request to authenticate (i.e. performing the NSSAA process on the requested S-NSSAI slice) the requested S-NSSAI. At step 314, the AAA-S (222) identifies the user details and services subscribed by the UE (102), and initiates the NSSAA process for the requested S-NSSAI slice (116a).

At step 316, upon completion of the NSSAA process of the requested S-NSSAI slice (116a), the AAA-S (222) sends a response for the received AAA protocol message to the NSSF device (218) indicating a success or failure of the NSSAA process for the requested S-NSSAI slice (116a). At step 318, the NSSF device (218) forwards the received response from the AAA-S (222) to the AMF device (206) as authentication response to the authentication message received at step 310. Steps 320-332 illustrate a similar process sequence as described for steps 302-318 for another requested S-NSSAI slice (116); therefore the explanation for these steps are omitted for sake of brevity of the specification.

At step 334, the AMF device (206) sends a response to the UE (102) indicating a success or a failure of the request initiated by the UE (102) to access the S NSSAI slice (116a).

At step 336, the AMF device (206) may initiate the UE configuration update procedure towards the UE (102) to update the UE configuration for access and mobility management-related parameters, Allowed NSSAI, Configured NSSAI and NSSAA status. For example, the requested S-NSSAI slice (116a) is stored as allowed S-NSSAI in the UE (102) when successful grant of the access request of the S-NSSAI is received. However, if the access request of the S-NSSAI slice (116a) is un-successful then the requested S-NSSAI slice (116a) is stored as rejected S-NSSAI in the UE (102). Further, the requested S-NSSAI slices for which response is awaited from the AMF device (206) are stored as pending S-NSSAI slice in the UE (102). At step 338, if the Network Slice-Specific Authentication and Authorization fails for all S-NSSAIs (if any) in the existing Allowed NSSAI for the UE (102) and (if any) for all S-NSSAIs in the Requested NSSAI, the AMF (206) shall execute the Network-initiated Deregistration procedure described in clause 4.2.2.3.3 and the AMF (206) shall include in the explicit De-Registration Request the list of Rejected S-NSSAIs, each of them with the appropriate rejection cause value.

Figure 4A:
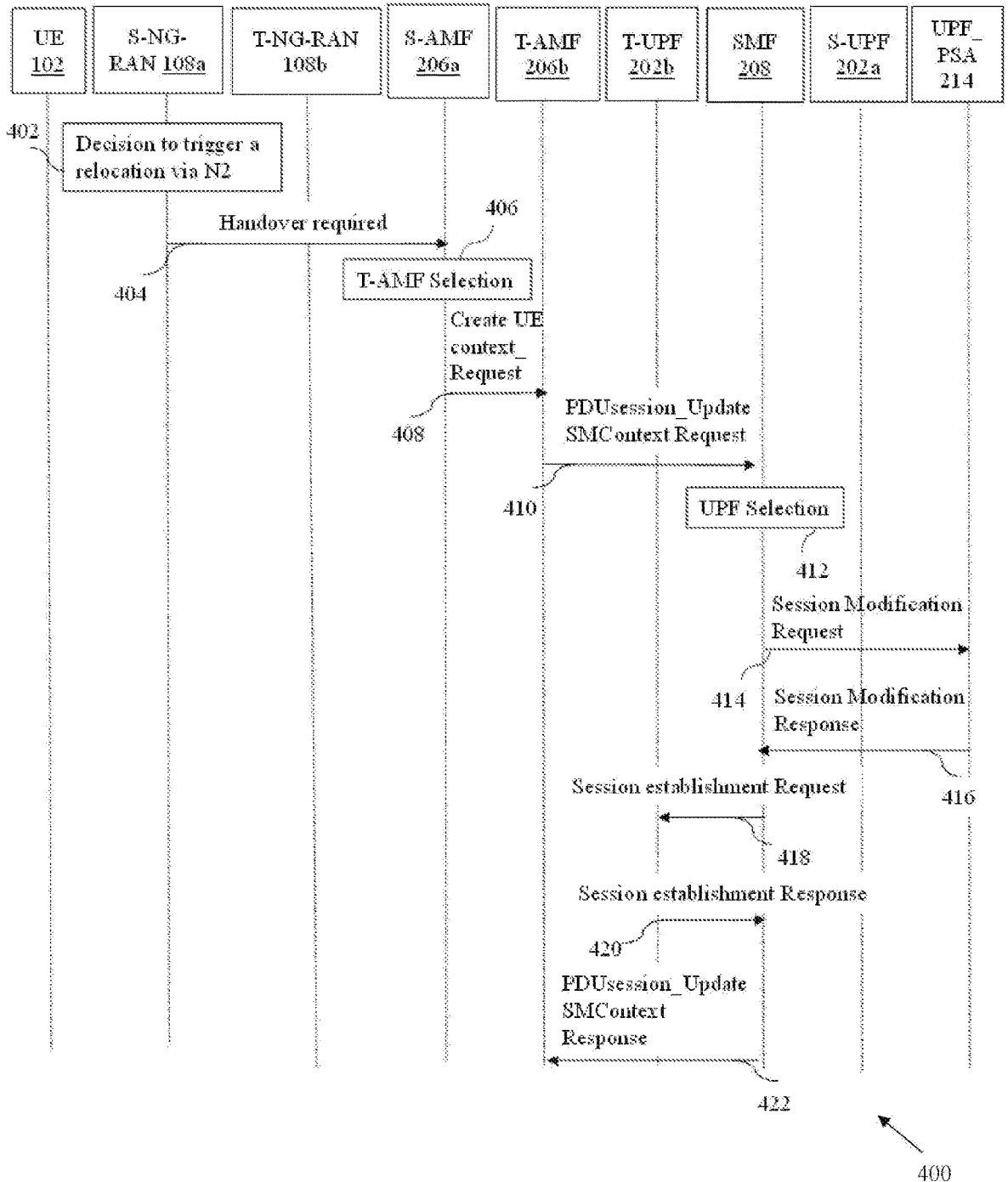
FIGS. 4A and 4B collectively illustrate a sequential diagram representing a handover process of a UE from a source NG_RAN to a target NG_RAN, according to an embodiment as disclosed herein.
Figure 4B:
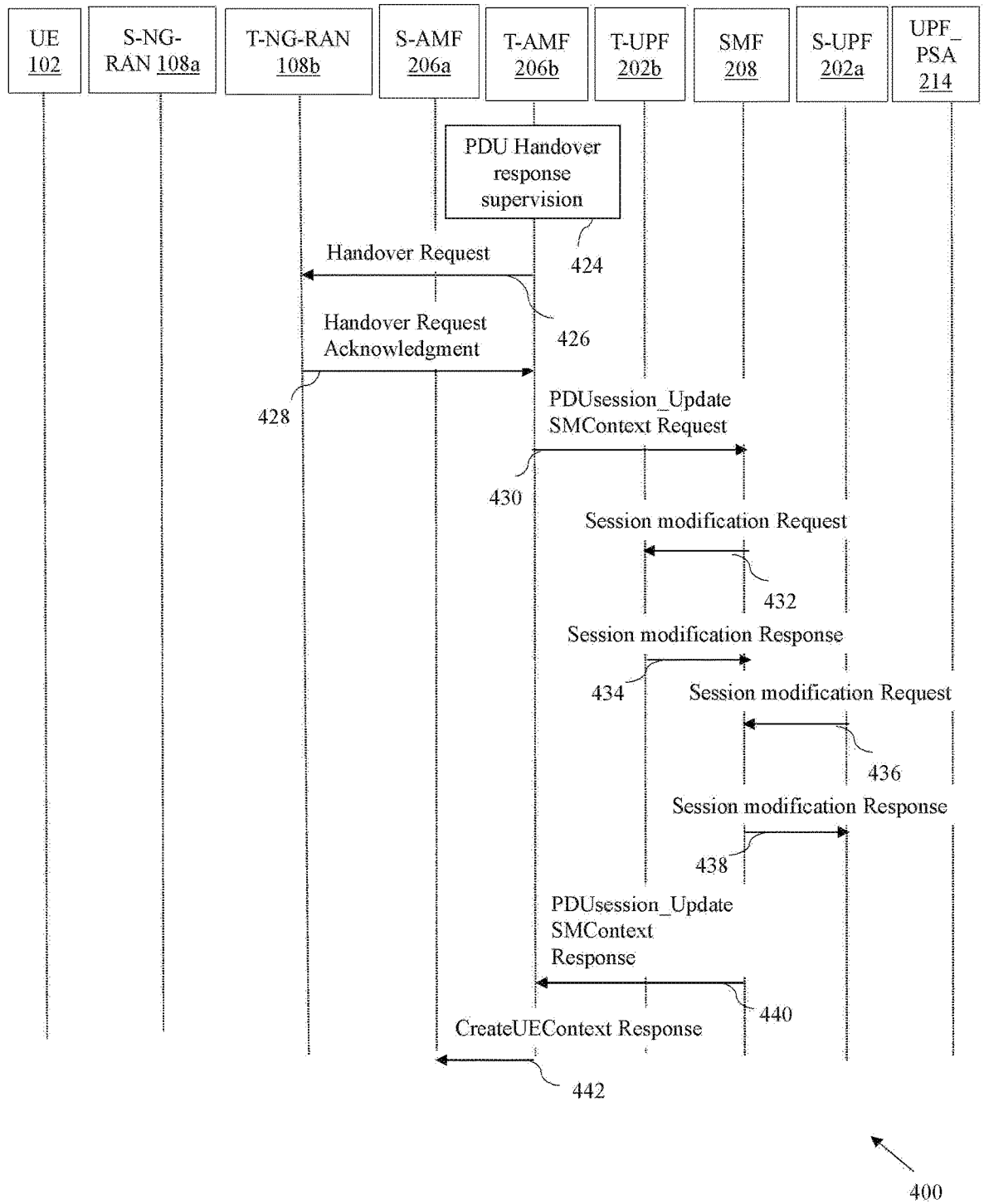

FIGS. 4A and 4B collectively illustrate a sequential diagram representing a handover process (400) of the UE (102) from a source NG_RAN (108a) to a target NG_RAN (108b), according to an embodiment as disclosed herein. The FIGS. 4A and 4B show that the UE (102) is connected to the source NG RAN (S-NG RAN) (108a) for network connection and network services. The S-NG_RAN (108a) is connected to a source AMF (S-AMF) device (206a) of the mobile core network (112) and a source UPF (S-UPF) device (202a) of the mobile core network (112). In an embodiment, the UE (102) traverses from a geographical region of the S-NG_RAN (108a) to a geographical region of a target NG_ RAN (T-NG_RAN) (108b), and thus a handover process of the UE (102) is triggered by the S-NG_RAN (108a), as shown in step 402. The T-NG_RAN (108b) may be considered as the closest NG_ RAN (108) to the UE (102). In an embodiment, the T-NG_RAN (108b) is connected to a target AMF (T-AMF) device (206b) and a target UPF (T-UPF) device (202b).

In an embodiment, the SMF device (208) of the mobile core network (112) is connected to the S-NG_RAN (108a) and the T-NG_RAN (108b) via AMF (206) and manages the connection of the UE (102) with the S-NG_RAN (108a) and the T-NG_RAN (108b). In an embodiment, the UPF_PSA device (214) along with the SMF device (208), manages PDU sessions of the UE (102) with the S-NG_RAN (108a) and the TG-NG_RAN (108b). The UPF_PSA device (214) is configured to provide mobility within and between access networks (106), including sending one or more end marker packets to the respective NG_RAN (108) during the handover process of the UE (102).

In an embodiment, upon triggering of the handover process of the UE (102) from the S-NG_RAN (108a) to the T-NG_RAN (108b), the method goes to step 404. At step 404, the S-NG_RAN (108a) sends a handover initiation request to the S-AMF device (206a). At step 406, upon receiving the handover initiation request, the S-AMF device (206a) selects the T-AMF device (206b), and at step 408, the S-AMF device (206a) initiates a transfer of context related to the ongoing communication with the UE (102) to the T-AMF device (206b). The S-AMF device (206a) creates a UEcontext_message request and sends the UEcontext_message request to the target AMF (206b) indicating the handover request from the source AMF device (206a).

At step 410, the T-AMF device (206b) sends a session update request message PDUsession_UpdateSMContext Request) to the SMF device (208) requesting to modify the PDU session establishment according to the initiation of the handover process of the UE (102). At step 412, the SW device (208) selects the T-UPF device (202b) based on the received session update request message.

At step 414, the SMF device (208) sends a session modification request to the UPF_PSA device (214), and the UPF PSA_device (214), upon receiving the session modification request, switches the PDU sessions of the UE (102) from the S-UPF device (202a) to T-UPF device (202b), and at step 416, the UPF_PSA device (214) sends a session modification response to the SMF device (208) indicting the PDU sessions are linked to the T-UPF device (202b). At step 418, the SMF device (208) sends the session establishment request to the T-UPF device (202b) indicating new PDU session connection with the UE (102). At step 420, the T-UPF device (202b) sends session establishment response indicating acknowledgment and acceptance of the session establishment request. At step 422, upon receiving the session establishment response, the SMF device (208) sends a session update request response (i.e. PDUsession_UpdateSMContext Response) to the T-AMF device (206b) for the received session update request message from the T-AMF (206b). At step 424, the T-AMF device (206b) supervises the PDU session handover based on the received response message from the SMF device (208) and the UEcontext_message request received from the S-AMF device (206a), and further at step 426 the T-AMF device (206b) sends a handover request to the T-NG_RAN (108b). At step 428, the T-NG_RAN (108b) sends a handover request acknowledgment indicating an acceptance of the handover of the UE (102). The steps 430-440 are similar to steps 410-422; therefore the explanation of these steps is omitted for the sake of brevity of the specification. At step 422 the T-AMF device (206b) shares a UEcontext_message response to the S-AMF device (206a) as response to the received UEcontext_message request, and further indicates the successful transfer of UE context and PDU sessions from S-AMF device (206a) to T-AMF device (206b).

In the method (400) shown in FIGS. 4A and 4B, there may be two situation 1) considering that the one or more network slices (S-NSSAI slices (116)) for which PDU sessions are established for the UE (102) are already authenticated using NSSAA process and stored as allowed NSSAA and no NSSAA process is ongoing or pending. 2) considering that a few NSSAA process of one or more S-NSSAI slices (116) are ongoing or pending at the S-AMF device (206a) when the handover request is triggered. In later situation, it is very important to handle the ongoing or pending NSSAA processes of one or more S-NSSAI slices (116) during the handover process. The steps related to handling of the ongoing or pending NSSAA processes of one or more S-NSSAI slices (116) is explained in FIG. 5.

Figure 5:
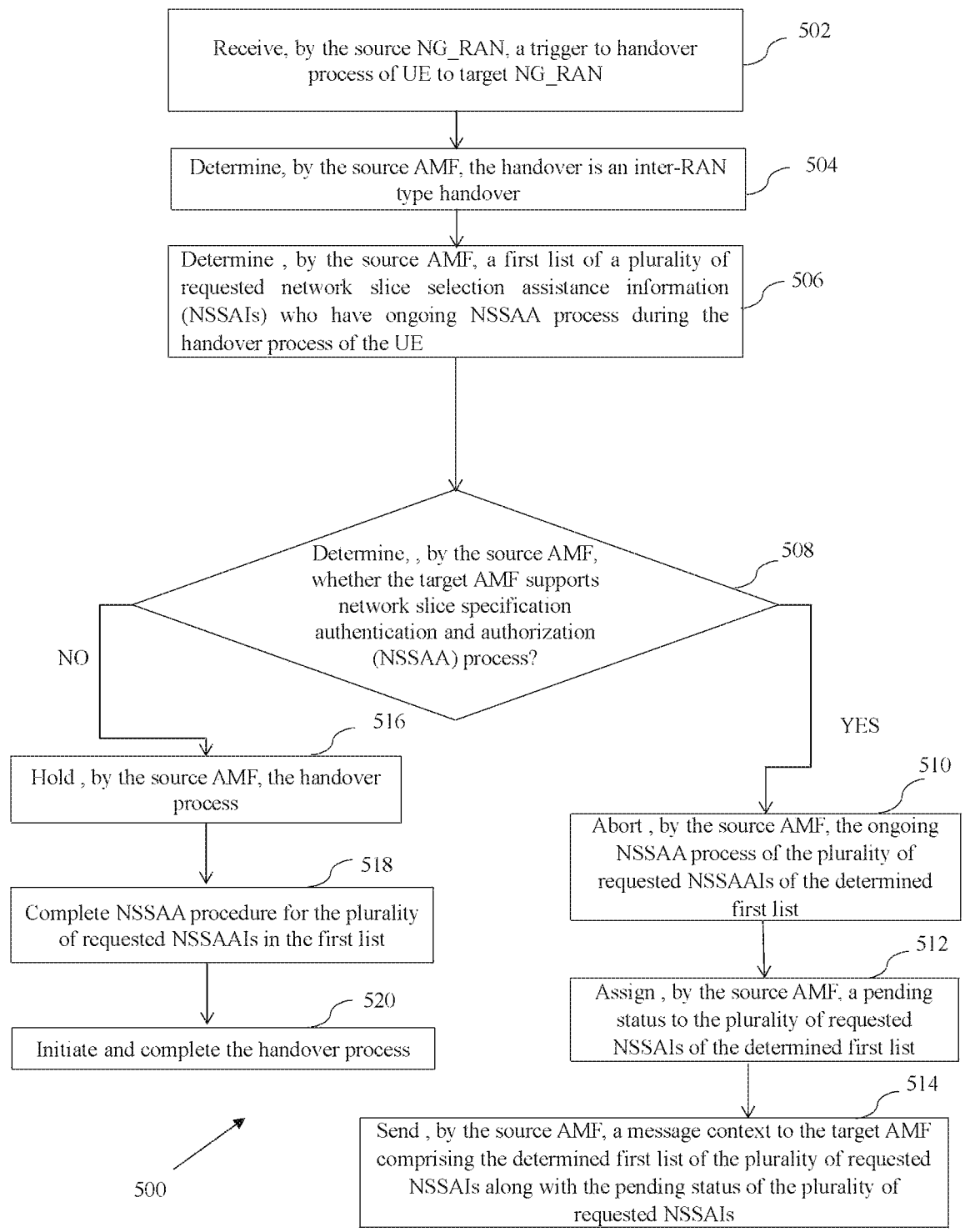
FIG. 5 illustrates a flow diagram representing a NSSAA process handling procedure during the handover of the UE, according to the embodiments as disclosed herein.

FIG. 5 illustrates a flow diagram representing various steps of a NSSAA process handling method (500) during the handover of the UE (102), according to embodiments as disclosed herein of.

At step 502, the S-AMF device (206a) receives a trigger of handover of the UE (102) from the S-NG_RAN (108a) indicating a relocation of the UE (102) from the geographical region of the S-NG_RAN (108a) to the geographical region of the T-NG_RAN (108b). At step 504, the S-AMF device (206a) determines whether the handover process is an inter-NG_RAN handover process. In the inter-NG_RAN process, the target NG_RAN (108b) belongs to a different registration area and is associated with different AMF device and UPF device.

At step 506, upon determining that the handover process is an inter-NG_RAN handover process (interchangeably may also be referred as "inter-AMF handover process"), the source AMF device (206a) determines a first list of a plurality of requested NSSAIs (116) who have ongoing NSSAA process during the handover process of the UE (102). In an embodiment, the ongoing or pending NSSAA process may indicate that the NSSAA process is initiated for the requested NSSAIs (116) but a PDU session establishment may be pending for the requested NSSAIs (116), or the NSSAA process is not initiated for the requested NSSAIs (116).

At step 508, the S-AMF device (206a) determines whether the T_AMF device (206b), selected for the handover process, supports the NSSAA process. If the T_AMF device (206b) supports the NSSAA process then the method (500) follows steps from (510-514), otherwise the method (500) follows steps from (516-520).

At step 510, the S-AMF device (206a) aborts the ongoing NSSAA processes of the plurality of requested NSSAAIs (116) of the determined first list. At step 512, the S-AMF device (206a) assigns a pending status to the plurality of requested NSSAIs (116) of the determined first list. In one example embodiment, the S-AMF device (206a) may indicate the AUSF device (210) that the NSSAA process of the requested S-NSSAI slice (116a) is aborted by sending a message. The S-AMF device (206a) may also indicate the AUSF device (210) or the NSSAAF (218) that the NSSAA process of the requested S-NSSAI slice (116a) is aborted due to the handover process of the UE (102). On receiving this message from the S-AMF device (206a), the AUSF device (210) or the NSSAAF (218) sends a message to the AAA-S (222) and indicate about the aborted NSSAA processes of the requested S-NSSAI slice (116a) is aborted due to the handover process of the UE (102).

At step 514, the S-AMF device (206a) sends a UEcontext_message to the target AMF device (206b) comprising the determined first list of the plurality of requested NSSAIs along with the pending status of the plurality of requested NSSAIs (116). The pending status of NSSAA process of the plurality of requested NSSAIs (116) is included in the UEcontext_message shared with the T-AMF device (206b). The format of authentication status of the NSSAA process in the UEcontext_message is shown in the FIGS. 6A and 6B.

At step 516, the method includes holding, by the source AMF, the handover process. At step 518, the method includes completing the NSSAA procedure for the plurality of requested NSSAAIs in the first list. At step 520, the method includes initiating and completing the handover process.

FIG. 6A illustrates a table (600) indicating different types of authentication status for the NSSAA process associated with the S-NSSAI slice (116a), according to embodiments as disclosed herein of. In an embodiment, a row 602 of the table 600 shows "EAP success" authentication status for the NSSAA process carried for the S_NSSAI slice (116a) indicating that the NSSAA process is successful, accordingly the S-NSSAI slice (116a) can be included as an allowed S-NSSAI slice with the UE (102), and the UE (102) can start PDU sessions via the allowed S-NSSAI slice (116a) with the service providers. A row 604 shows "EAP failure" authentication status for the NSSAA process carried for the S_NSSAI slice (116a) indicating that the NSSAA process is un-successful, accordingly the S-NSSAI slice (116a) can be included as a rejected S-NSSAI slice with the UE (102). Further, a row 606 shows "Pending" authentication status for the NSSAA process carried for the S_NSSAI slice (116a) indicating that the NSSAA process is still ongoing for the S-NSSAI slice (116a).

FIG. 6B illustrates a table (605) representing NSSAA status for specific S-NSSAI slice in the UE context message, according to embodiments as disclosed herein of. In an embodiment, the row (608) of the table (605) indicates slice attribute name of the S-NSSAI slice (116a) and row (610) indicates status of the NSSAA process of the respective S-NSSAI (116a).

Figure 7:
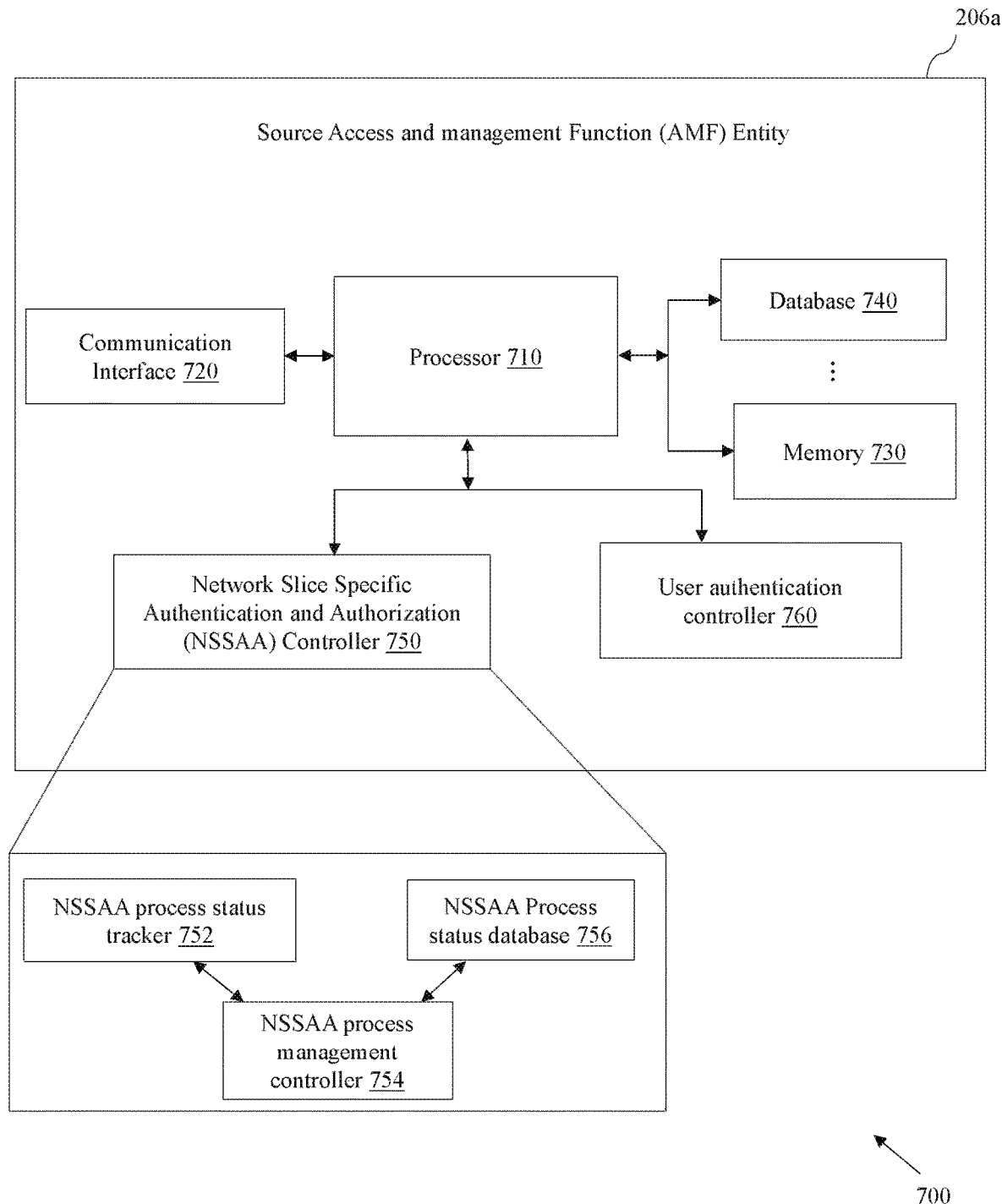
FIG. 7 illustrates a component diagram of the source AMF for implementation of the NSAA process handling procedure during the handover of the UE, according to embodiments as disclosed herein.

FIG. 7 illustrates a component diagram of the S-AMF device (206a) for handling of the ongoing or pending NSSAA processes during the handover process of the UE (102), according to embodiments as disclosed herein.

The S-AMF device (206a) includes a processor (710), a communication interface (720), a memory (730), a database (740), a network slice specific authentication and authorization (NSSAA) controller (750), and a user authentication controller (760). The components of the S-AMF device (206a) provided herein may not be exhaustive and that the S-AMF device (206a) may include more or fewer components than that of depicted in FIG. 7. Further, two or more components may be embodied in one single component, and/or one component may be configured using multiple sub-components to achieve the desired functionalities. Some components of the S-AMF device (206a) may be configured using hardware elements.

The processor (710) is coupled with the memory (730), the communication interface (720), the NSSAA controller (750), the user authentication controller (760), and the database (740). The processor (710) is configured to execute instructions stored in the memory (730) and to perform various processes. The communication interface (720) is configured for communicating internally between internal hardware components and with external devices via one or more networks.

The processor (710), and the NSSAA controller (750) may include one or more processing units (e.g., in a multi-core configuration). The S-AMF device (206a) interacts with external units such as the AUSF device (210), the T-AMF device (206b), the UPF device (202), the AAA-S (222), and/or the like via the communication interface (720).

The memory (730) stores instructions to be executed by the processor (710). The memory (730) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (730) may, in some examples, be considered a non-transitory storage medium. The term "non-transitory" may indicate that the storage medium is not embodied in a carrier wave or a propagated signal. However, the term "non-transitory" should not be interpreted that the memory (730) is non-movable. In certain examples, a non-transitory storage medium may store data that can, over time, change (e.g., in Random Access Memory (RAM) or cache). The S-AMF device (206a) is configured to implement the method (500) as explained in the FIG. 5 for handling ongoing or pending NSSAA processes during handover process of the UE (102).

The processor (710) may also be operatively coupled to the database (740). The database (740) is any computer-operated hardware suitable for storing and/or retrieving data. The database (740) may include, but not limited to, a storage area network (SAN) and/or a network attached storage (NAS) system. In other embodiments, the database (740) may be external to the S-AMF device (206a), and may be accessed by the S-AMF device (206a) using a storage interface. The storage interface is any component capable of providing the processor (710) with access to the database (740).

In an embodiment, the processor (710) is configured to receive S-NSSAI slice (116a) access request from the UE (102), and further configured to authenticate the UE (102), via the user authentication controller (760), for validating user subscription details which are stored in the database (740) of the S-AMF device (206a).

In an embodiment, the processor (710), is configured to receive, via the communication interface (720), a trigger for handover process of the UE (102) from the S-NG_RAN (108a). The processor (710) is further configured to determine whether the handover process is inter-NG_RAN handover process. The processor (710), upon determination that the handover process is inter-NG_RAN handover process, manages ongoing or pending NSSAA processes using the NSSAA process controller (750). The NSSAA process controller (750) includes a NSSAA process status tracker (752), a NSSAA process management controller (754), and a NSSAA process status database (756). Upon determination of the handover process as inter-NG_RAN handover process, the NSSAA process management controller (754) fetches a plurality of first list of a plurality of requested NSSAIs (116) who have ongoing NSSAA process during the handover process of the UE (102), from the NSSAA process status tracker (752). The NSSAA process status tracker (752) is configured to maintain authentication status of the NSSAA processes of requested NSSAIs (116). The requested S-NSSAIs along with authentication of their respective NSSAA process are stored in the NSSAA process status database (756).

The NSSAA process management controller (754) is further configured to determine whether the T-AMF device (206b) supports NSSAA process or not. The NSSAA process management controller (754) is further configured to prioritize one of the handover process or the ongoing NSSAA processes based on whether the T-AMF device (206b) supports NSSAA process or not. The NSSAA process management controller (754) is configured to give priority to the handover process over the ongoing NSSAA process if the T-AMF device (206b) supports NSSAA process, otherwise the NSSAA process management controller (754) is configured to hold the handover process and complete the ongoing NSSAA processes of the requested S-NSSAIs (124). When the T-AMF device (206b) supports NSSAA process, the NSSAA process management controller (754) holds the ongoing NSSAA processes of the requested S-NSSAIs (116), and assign pending status to the ongoing NSSAA processes of the requested S-NSSAIs (116). The list of the ongoing NSSAA processes of the requested S-NSSAIs (116) with pending status is updated with the NSSAA process status tracker (752) and the NSSAA process status database (756). The NSSAA process management controller (754) is further configured to generate the UEcontext_message including the list of the ongoing NSSAA processes of the requested S-NSSAIs (116) with pending status, and send the UEcontext_message to the T-AMF device (206b).

In an example embodiment, the processor (710) of the S-AMF device (206a) may also be configured to indicate the AUSF device (210) that the NSSAA process of the requested S-NSSAI slice (116) is aborted by sending a message. The S-AMF device (206a) may also indicate the AUSF device (210) that the reason to abort the NSSAA process of the requested S-NSSAI slice (116) is the handover process of the UE (102).

Figure 8:
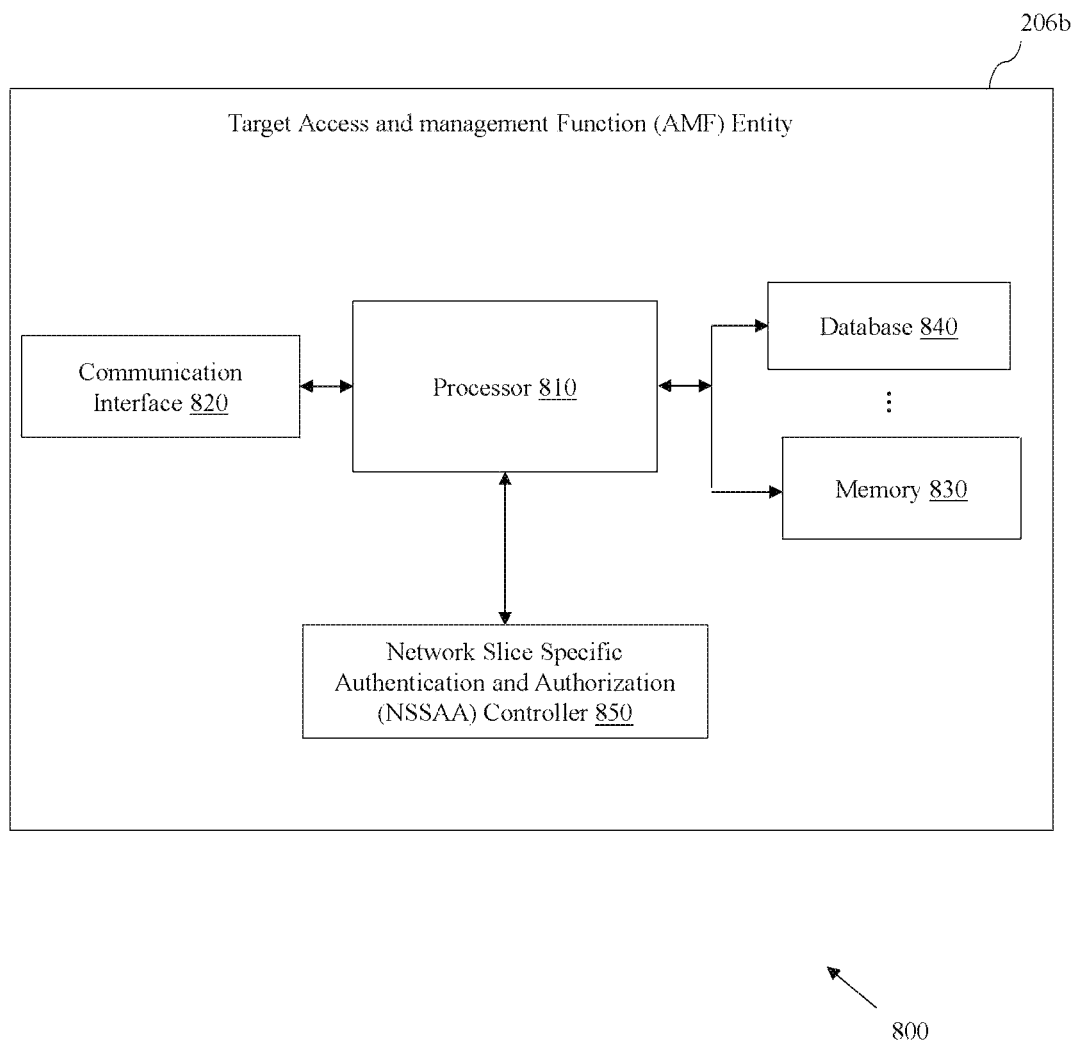
FIG. 8 illustrates a component diagram of the target AMF for implementation of the NSAA process handling procedure after the handover of the UE, according to embodiments as disclosed herein.

FIG. 8 illustrates a component diagram of the T-AMF device (206b) for handling of the ongoing or pending NSSAA processes during the handover process of the UE (102), according to embodiments as disclosed herein.

The T-AMF device (206b) includes a processor (810), a communication interface (820), a memory (830), a database (840), a target network slice specific authentication and authorization (NSSAA) controller (850). The components of the T-AMF device (206b) provided herein may not be exhaustive and that the T-AMF device (206b) may include more or fewer components than that of depicted in FIG. 8. Further, two or more components may be embodied in one single component, and/or one component may be configured using multiple sub-components to achieve the desired functionalities. Some components of the T-AMF device (206b) may be configured using hardware elements.

The processor (810) is coupled with the memory (830), the communication interface (820), the target NSSAA controller (850), and the database (840). The processor (810) is configured to execute instructions stored in the memory (830) and to perform various processes. The communication interface (820) is configured for communicating internally between internal hardware components and with external devices via one or more networks.

The processor (810) and the NSSAA controller (850) may include one or more processing units (e.g., in a multi-core configuration). The T-AMF device (206b) interacts with external units such as the AUSF device (210), the S-AMF device (206a), the UPF device (202), the AAA-S (222), and/or the like via the communication interface (820).

The memory (830) stores instructions to be executed by the processor (810). The memory (830) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (830) may, in some examples, be considered a. non-transitory storage medium. The term "non-transitory" may indicate that the storage medium is not embodied in a carrier wave or a propagated signal. However, the term "non-transitory" should not be interpreted that the memory (830) is non-movable. In some examples, the memory (830) can be configured to store larger amounts of information than the memory. In certain examples, a non-transitory storage medium may store data that can, over time, change (e.g., in Random Access Memory (RAM) or cache). The T-AMF device (206b) is configured to implement the method for handling ongoing or pending NSSAA processes after handover process of the UE (102) is completed.

The processor (810) may also be operatively coupled to the database (840). The database (840) is any computer-operated hardware suitable for storing and/or retrieving data. The database (840) may include, but not limited to, a storage area network (SAN) and/or a network attached storage (NAS) system. In other embodiments, the database (840) may be external to the T-AMF device (206b), and may be accessed by the T-AMF device (206b) using a storage interface. The storage interface is any component capable of providing the processor (810) with access to the database (840).

In an embodiment, the processor (810) is configured to the UEcontext_message from the S-AMF device (206a), and extract list of pending or ongoing NSSAA processes of the received S-NSSAI slice (116). The processor (810) initiate, via the target NSSAA process controller (850), the NSSAA process of the of the received S-NSSAI slice (116) which were aborted during the handover process of the UE (102).

In an embodiment, the processor (810) is further configured to update, via the target NSSAA process controller (850), status of the NSSAA processes based on authentication result of the NSSAA process after completion. For example, if the NSSAA process is successful then the authentication status of the NSSAA process is marked as "EAP-success", whereas if the NSSAA process is un-successful then the authentication status of the NSSAA process is marked as "EAP-failure". The processor (810) is further configured to update, via the target NSSAA process controller (850), the status of the requested one or more S-NSSAI slices (116) according to authentication status of their respective NSSAA processes. For example, for "EAP-success" of the NSSAA process, the S-NSSAI slice (116a) of the one or more S-NSSAI slices (116) is marked as allowed S-NSSAI, and for "EAP-failure" of the NSSAA process, the S-NSSAI slice (116a) one or more S-NSSAI slices (116) is marked as rejected S-NSSAI.

In an embodiment, the updates status of the NSSAA processes as well as the one or more requested S-NSSAI slices (116) are stored in the database (840). In an embodiment, the updated status of the S-NSSAI are shared with the UE (102) and the S-AMF (206a) via the communication interface (820).

In an example embodiment, in case that an authentication status for NSSAA process of at least one NSSAI is "EAP-success" or "EAP-failure", the processor (810) may be further configured to skip the NSSAA process of the at least one NSSAI. For example, in case that authentication status for NSSAA process associated with the S-NSSAI slice is "EAP-success" or "EAP-failure", the processor (810) may be configured to skip the NSSAA process in the registration process.

The embodiments disclosed herein can be implemented using at least one hardware device and performing network management functions to control the elements.

Figure 9:
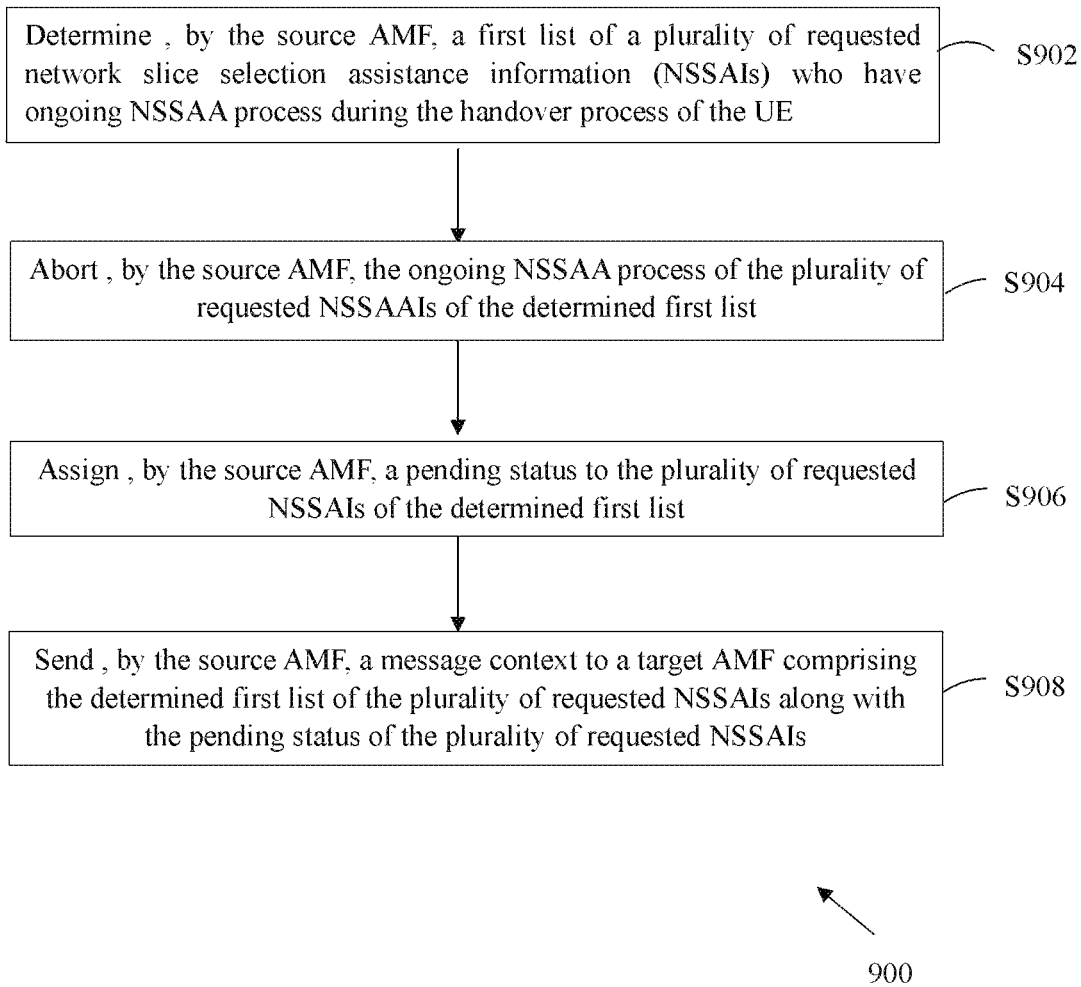
FIG. 9 illustrates flow chart illustrating a method for handling ongoing or pending NSSAA processes during the handover of the UE, according to embodiments as disclosed herein.

FIG. 9 is a flow chart illustrating a method (900) for handling ongoing or pending NSSAA processes during the handover of the UE (102), according to an embodiment as disclosed herein. The steps (S902-S908) are performed by the processor (710).

At S902, the method (900) includes determining a first list of a plurality of requested network slice selection assistance information (NSSAIs) (116) who have ongoing NSSAA process during the handover process of the UE (102).

At S904, the method (900) includes aborting the ongoing NSSAA process of the plurality of requested NSSAAIs of the determined first list due to the handover process initiation for the UE (102).

At S906, the method (900) includes assigning a pending status to the plurality of requested NSSAIs of the determined first list.

At S908, the method (900) includes sending a message context to a target AMF device (206b) comprising the determined first list of the plurality of requested NSSAIs (116) along with the pending status of the plurality of requested NSSAIs.

Figure 10:
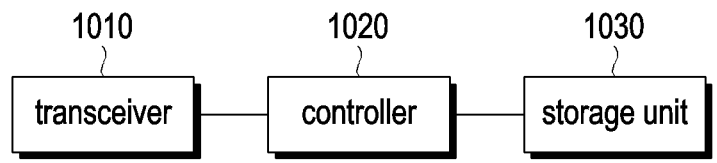
FIG. 10 is a block diagram illustrating the UE, according to an embodiment as disclosed herein.

FIG. 10 is a block diagram illustrating the UE, according to an embodiment as disclosed herein.

Referring to FIG. 10, the UE may include a transceiver 1010, a controller 1020, and a storage unit 1030. In the disclosure, the controller 1020 may be defined as a circuit, an application-specific integrated circuit, or at least one processor.

The transceiver 1010 may transmit/receive a signal to/from another network entity. For example, the transceiver 1010 may receive a synchronization signal or a reference signal from the base station.

The controller 1020 may control the overall operation of the UE according to an embodiment proposed by the disclosure. For example, the controller 1020 may control the signal flow to perform the operation according to the procedures of FIGS. 1 to 9 described above.

The storage unit 1030 may store at least one piece of information transmitted and received through the transceiver 1010 and information generated through the controller 1020. For example, the storage unit 1030 may store information and data for handling the NSSAA process described referring to FIGS. 1 to 9.

Figure 11:
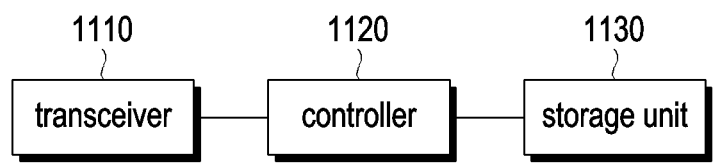
FIG. 11 is a block diagram illustrating the base station, according to an embodiment as disclosed herein.

FIG. 11 is a block diagram illustrating the base station, according to an embodiment as disclosed herein. The base station may be NG-RAN (e.g. S-NG-RAN, T-NG-RAN).

Referring to FIG. 11, the base station may include a transceiver 1110, a controller 1120, and a storage unit 1130. In the disclosure, the controller 1120 may be defined as a circuit, an application-specific integrated circuit, or at least one processor.

The transceiver 1110 may transmit/receive a signal to/from another network entity. For example, the transceiver 1110 may transmit a synchronization signal or a reference signal to the UE.

The controller 1120 may control the overall operation of the base station according to an embodiment proposed by the disclosure. For example, the controller 1120 may control the signal flow to perform the operation according to the procedures of FIGS. 1 to 9 described above.

The storage unit 1130 may store at least one piece of information transmitted and received through the transceiver 1110 and information generated through the controller 1120. For example, the storage unit 1130 may store information and data for handling the NSSAA process described referring to FIGS. 1 to 9.

Figure 12:
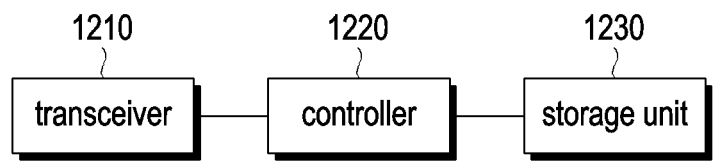
FIG. 12 is a block diagram illustrating the network entity, according to an embodiment as disclosed herein.

FIG. 12 is a block diagram illustrating the network entity, according to an embodiment as disclosed herein. The network entity (function) may be AMF, UPF, SMF, NSSF, NSSAAF, NEF, UDM, AUSF, AAA and/or AS/AF.

Referring to FIG. 12, the base station may include a transceiver 1210, a controller 1220, and a storage unit 1230. In the disclosure, the controller 1220 may be defined as a circuit, an application-specific integrated circuit, or at least one processor.

The transceiver 1210 may transmit receive a signal to/from another network entity. For example, the transceiver 1210 may transmit/receive data for handling the NSSAA process.

The controller 1220 may control the overall operation of the base station according to an embodiment proposed by the disclosure. For example, the controller 1220 may control the signal flow to perform the operation according to the procedures of FIGS. 1 to 9 described above.

The storage unit 1230 may store at least one piece of information transmitted and received through the transceiver 1210 and information generated through the controller 1220. For example, the storage unit 1230 may store information and data for handling the NSSAA process described referring to FIGS. 1 to 9.

The various actions, acts, blocks, steps, or the like in the flow chart (S900) may be performed in the order presented, in a different order or simultaneously. Further, in some embodiments, some of the actions, acts, blocks, steps, or the like may be omitted, added, modified, skipped, or the like without departing from the scope of the invention Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a source access and mobility function (AMF) entity in a wireless communication system, the method comprising:
identifying that a network slice specific authentication and authorization (NSSAA) procedure is ongoing for at least one single network slice selection assistance information (S-NSSAI);
identifying that an inter-AMF handover procedure is triggered from the source AMF entity to a target AMF entity; and
transferring, to the target AMF entity, an NSSAA status list for the at least one S-NSSAI to inform that an NSSAA status of the at least one S-NSSAI is pending.

2. The method as claimed in claim 1, wherein the NSSAA status list is used, by the target AMF entity, to determine whether to perform the NSSAA procedure for the at least one S-NSSAI.

3. The method as claimed in claim 1, comprising:
identifying that the NSSAA procedure is completed; and
marking the at least one S-NSSAI as a part of one of an allowed NSSAI list or a rejected S-NSSAI list.

4. The method according to claim 1, wherein the target AMF entity supports the NSSAA procedure.

5. The method according to claim 1, wherein the ongoing NSSAA procedure corresponds to non-assignment of a protocol data unit (PDU) session to a user equipment (UE) for the at least one S-NSSAI.

6. The method according to claim 1, wherein the NSSAA status list is included in a CreateUEContext request message transferred from the source AMF entity to the target AMF entity, the CreateUEContext request message being used to create a user equipment (UE) context in the target AMF entity.

7. A source access and management function (AMF) entity, the source AMF entity comprising:
a transceiver; and
a controller coupled with the transceiver and configured to:
identify that a network slice specific authentication and authorization (NSSAA) procedure is ongoing for at least one single network slice selection assistance information (S-NSSAI);

identify that an inter-AMF handover procedure is triggered from the source AMF entity to a target AMF entity; and
transfer, to the target AMF entity, an NSSAA status list for the at least one S-NSSAI to inform that an NSSAA status of the at least one S-NSSAI is pending.

8. The source AMF entity as claimed in claim 7, wherein the NSSAA status list is used, by the target AMF entity, to determine whether to perform the NSSAA procedure for the at least one S-NSSAI.

9. The source AMF entity as claimed in claim 7, wherein the controller is further configured to:
identify that the NSSAA procedure is completed; and
mark the at least one S-NSSAI as a part of one of an allowed NSSAI list or a rejected S-NSSAI list.

10. The source AMF entity according to claim 7, wherein the target AMF entity supports the NSSAA procedure.

11. The source AMF entity according to claim 7, wherein the ongoing NSSAA procedure corresponds to non-assignment of a protocol data unit (PDU) session to a user equipment (UE) for the at least one S-NSSAI.

12. The source AMF entity according to claim 9, wherein the NSSAA status list is included in a CreateUEContext request message transferred from the source AMF entity to the target AMF entity, the CreateUEContext request message being used to create a user equipment (UE) context in the target AMF entity.

13. A method performed by a target access and mobility function (AMF) entity in a wireless communication system, the method comprising:
receiving, from a source AMF entity, a network slice specific authentication and authorization (NSSAA) status list for at least one single network slice selection assistance information (S-NSSAI) to inform an NSSAA status of the at least one S-NSSAI; and
determining whether to perform an NSSAA procedure for at least one S-NSSAI based on the NSSAA status list, and
wherein in case that the NSSAA procedure is ongoing for at least one S-NSSAI, the NSSAA status list informs that the NSSAA status of the at least one S-NSSAI is pending.

14. The method according to claim 13, further comprising:
updating the NSSAA status of the at least one S-NSSAI; and
sending the updated NSSAA status of the at least one S-NSSAI to a user equipment (UE), and
wherein the updated NSSAA status of the at least one S-NSSAI is a first status indicating that the NSSAA status of the at least one S-NSSAI is successful or a second status indicating that the NSSAA status of the at least one S-NSSAI is a failure.

15. A target access and management function (AMF) entity, the target AMF entity comprising:
a transceiver; and
a controller coupled with the transceiver and configured to:
receive, from a source AMF entity, a network slice specific authentication and authorization (NSSAA) status list of at least one single network slice selection assistance information (S-NSSAI) to inform an NSSAA status of the at least one S-NSSAI, and
determine whether to perform an NSSAA procedure for at least one S-NSSAI based on the NSSAA status list, and
wherein in case that the NSSAA procedure is ongoing for at least one S-NSSAI, the NSSAA status list informs that the NSSAA status of the at least one S-NSSAI is pending.

16. The target AMF entity according to claim 15, wherein the controller is further configured to:
update the NSSAA status of the at least one S-NSSAI; and
send the updated NSSAA status of the at least one S-NSSAI to a user equipment (UE), and
wherein the updated NSSAA status of the at least one S-NSSAI is a first status indicating that the NSSAA status of the at least one S-NSSAI is successful or a second status indicating that the NSSAA status of the at least one S-NSSAI is a failure.

* * * * *